July 30, 1957  A. P. ADAMSON  2,801,097
ACCELERATION RESPONSIVE DEVICE HAVING ERROR COMPENSATION
Filed Oct. 29, 1954
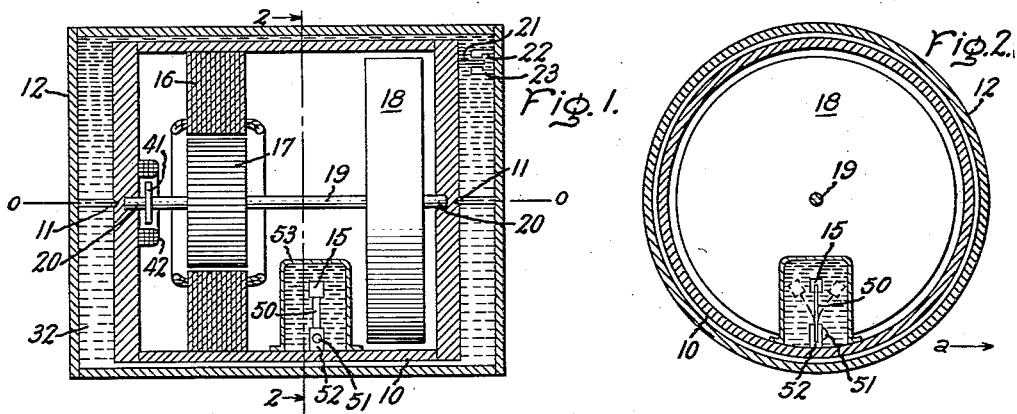
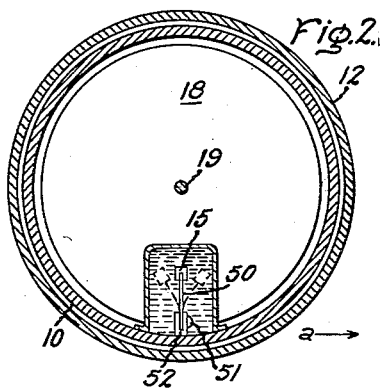
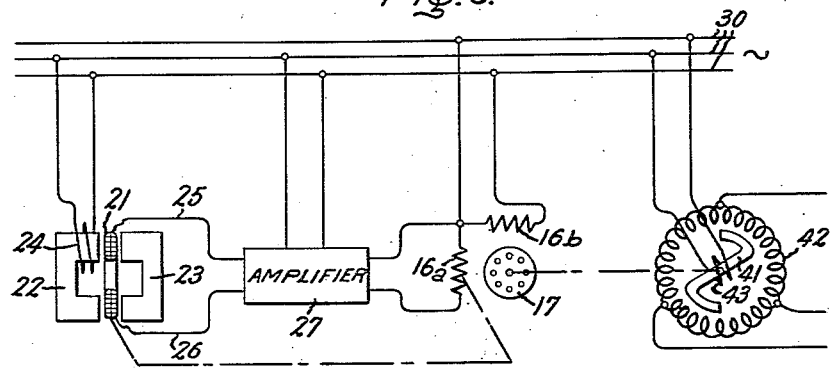
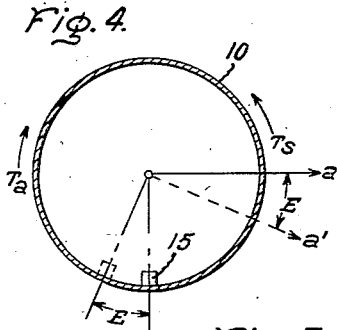
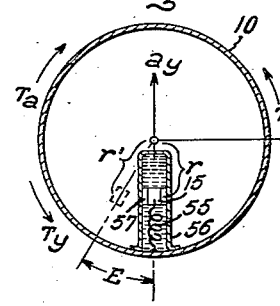
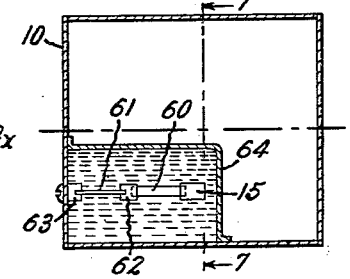
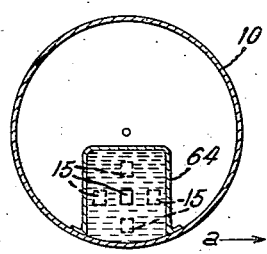
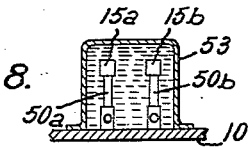
Inventor:
Arthur P. Adamson,
by *Claude A. Mott*
His Attorney.

United States Patent Office 2,801,097
Patented July 30, 1957

2,801,097
ACCELERATION RESPONSIVE DEVICE HAVING ERROR COMPENSATION

Arthur P. Adamson, Schenectady, N. Y., assignor to General Electric Company, a corporation of New York Application October 29, 1954, Serial No. 465,648

5 Claims. (Cl. 264—1)

This invention relates to an acceleration responsive device and more particularly to such a device in which the acceleration responsive element is rotatably mounted.

The present invention constitutes an improvement on acceleration responsive devices of the type having the acceleration responsive element rotatably mounted. One device of this type is disclosed in a co-pending application of Frithiof V. Johnson, entitled "Acceleration Responsive Device," filed October 4, 1954, Serial No. 459,909 and assigned to the assignee of the present invention.

In the Johnson application referred to above which is discussed here for illustrative purposes, there is provided an acceleration responsive device having an acceleration responsive element pivotally mounted for free rotation, and having an unbalance mass eccentrically mounted on the acceleration responsive element so as to unbalance the element whereby a torque is imparted to the unbalanced element in response to linear accelerations with resulting angular movement of the unbalanced element. A servo system responsive to this angular movement of the unbalanced element imparts a counter-torque thereto to return the element to the original position. When devices of this type are mounted in vehicles, particularly guided missiles, they are sometimes subject to certain errors. One such error may be brought about by the sensitivity of the acceleration responsive element to high frequency vibrations of the craft on which the device is mounted, for example, vibrations caused by the functioning of the propulsion system or by aerodynamic forces. The high velocity linear accelerations resulting from these vibrations tend to saturate the counter-torque producing means so that it does not properly counterbalance the torque produced by the steady state accelerations, that is, those accelerations which it is desired to measure.

Another error encountered on occasion is that caused by the shifting of the sensitive axis of the unbalanced element away from the direction in which it is desired to measure the accelerations as may be seen, for example, in Figure 4. Thus if the acceleration desired to be measured is in the direction "$a$," then the freely pivoted unbalanced acceleration responsive element in responding to this acceleration rotates through a small angle E with the accompanying shift in the sensitive axis of the device to $a'$.

It is accordingly an important object of this invention to provide an acceleration responsive device in which there is compensation for the above mentioned errors.

Another object is to provide an acceleration responsive device having an unbalanced acceleration responsive element rotatably mounted in which the effect of unwanted vibrations is substantially reduced or eliminated.

Another object is to provide such a device having an accurately maintained sensitive axis for measuring accelerations.

Briefly stated in accordance with one aspect of this invention the unbalance mass carried by the rotatable acceleration responsive element is resiliently mounted so that torques transmitted by unwanted higher frequency vibrations to the rotatable element are substantially reduced or eliminated. Also the mass is mounted so that the measuring direction of the device is accurately maintained.

Additional features, advantages and objects of this invention will become apparent and the invention will be better understood from a perusal of the following description taken in connection with the single sheet of drawings, and the scope of the invention will be pointed out in the claims.

In the drawings, Figure 1 is a diagrammatic sectional view of a device illustrating one embodiment of this invention.

Figure 2 is a view taken along line 2—2 of Figure 1.

Figure 3 is a circuit diagram illustrating the operation of the electrical components of the device shown in Figure 1.

Figure 4 is a sketch illustrating the forces acting on the acceleration responsive element.

Figure 5 is a sectional view of the acceleration responsive element illustrating a second embodiment of this invention.

Figure 6 is a sectional view of the acceleration responsive element illustrating another embodiment of this invention.

Figure 7 is a view taken along lines 7—7 of Figure 6.

Figure 8 is a sectional view illustrating another form of unbalancing mass.

The acceleration responsive device shown in Figures 1, 2 and 3 is similar to that disclosed in the above-mentioned Johnson application. In order to facilitate understanding of this invention, certain portions of the description in the Johnson application are repeated herein.

An acceleration responsive element is provided and is mounted for rotation about an axis. In the illustrated embodiment, this element is in the form of a container 10 pivotally mounted by bearing means 11 for rotation about an axis 0—0. The bearing means 11 are mounted within a housing 12, which is fixed with respect to the member whose acceleration is to be measured.

The container 10 has its center of gravity displaced from its axis of rotation, whereby a torque is transmitted to the container in response to linear acceleration of the housing in a direction other than one in alignment with the axis of rotation. In the illustrated embodiment, the center of gravity is so located by the use of an unbalance mass 15 mounted eccentrically in the container 10.

Means are provided for imparting a counter-torque to the container in response to the torque caused by the linear acceleration. This means in the illustrated embodiment is in the form of an electric motor mounted within the container 10, including a stator 16, a rotor 17, and a flywheel 18, mounted on the rotor shaft 19. The shaft 19 is mounted for rotation by bearing means in the form of journals 20 provided in the container 10.

Pick-off means are provided for producing a signal in response to angular movement of the container relative to housing 12. This pick-off means is in the form of a movable coil 21, which is fixed on the container 10 and moves with the container within the air gap of a closed magnetic circuit made up of magnetizable members 22 and 23 mounted on the inside of housing 12 and energized by a coil 24.

Circuit means are provided for applying the signal produced in the pick-off means to the motor, so as to impart a counter-torque to the container 10. This circuit means includes the leads 25 and 26, connecting the coil 21 through an amplifier 27 to one phase 16$a$ of the stator 16 of the two-phase motor. The other phase 16$b$ of the stator 16 is connected to a suitable A.-C. power source 30, and the power for the amplifier 27 and for energizing the pick-off coil 24 is also obtained from the source 30. Flexible connectors, suitably insulated (not shown in Fig. 1), are used to transmit power and signals between the container 10 and the housing 12 in accordance with the circuit shown in Fig. 3. The pick-off signal is applied to the motor so that the rotation of the rotor and the flywheel will be in the same direction as the torque imparted to the container by the acceleration, whereby the reaction torque on the stator will be in the opposite direction, acting to return the container to the original position.

A liquid 32 surrounds the container 31 and fills the space between the container and the housing 12. The relation between the density of the liquid and the weight and weight distribution of the container, including the apparatus mounted inside the container, is made such that the container is neutrally suspended within the liquid.

Means are provided for obtaining a signal proportional to the displacement of the rotor with respect to the container 10. In the illustrated embodiment, this means is in the form of a selsyn mounted within the container 10 and comprising a rotary member 41 mounted on the shaft 19, and a field winding 42 mounted in the container 10. The energizing winding 43 (Fig. 3) for the rotor of the selsyn receives power from the source 30. The output voltage from the field 42 of the selsyn may be used as a control signal in the energization of an autopilot used in the actuation of the control surfaces of the aircraft or missile in which the acceleration responsive device of this invention is used. An example of such an autopilot may be seen in U. S. Patent 2,416,097 to Hansen, Jewell, Johnson, and Porter.

In operation, the acceleration responsive device of the Johnson application is preferably mounted on a stabilized table within an aircraft, missile or other vehicle so that accelerations of the vehicle are imparted to the acceleration responsive device through the housing 12. Thus, if the device is subjected to an acceleration in a direction perpendicular to the Fig. 1 sketch, or in the direction "$a$" as seen in Fig. 4, an acceleration torque $T_a$, is imparted to the container 10. The effect of this first torque is to cause a slight rotation of the unbalanced container 10, as through an angle E. In response to movement of the container caused by this torque $T_a$, a signal is generated within the pick-off coil 21 which is amplified and applied to the motor to cause a reaction torque $T_s$ on the stator 16, which is a counter-torque acting to restore the container 10 to the original position.

The unbalance mass 15 of the present invention is mounted on a damped resilient support carried by the acceleration responsive element or container 10. This support is in the form of a leaf spring 50 secured at one end by a capscrew 51 to a bracket 52 fixed on the inner surface of the container 10, and carrying the unbalance mass 15 at its other end. Damping of this spring and mass system in the illustrated embodiment is accomplished by the provision of an oil-filled case 53 secured to the container 10 and surrounding the mass 15 and spring 50. The spring 50 is so mounted that it is flexible in the direction of the acceleration and bends as shown in Fig. 2 in response to vibrations having frequencies i. e. linear velocities higher than those to be measured so that no appreciable torque in transmitted to the acceleration responsive element. Compensation is thus made for errors otherwise introduced by such high frequency vibrations.

In the Figure 5 embodiment, the unbalance mass 15 is mounted on a damped resilient member in the form of a coil spring 55 secured at one end to the inner periphery of the container 10 and carrying the unbalance mass 15 at its other end. Damping again is achieved by surrounding the spring and mass system with an oil-filled case 56 secured to the container 10. This case 56 serves the additional function of providing a guide for the oscillations of the unbalance mass 15 insuring that such oscillations will be in a directional substantially perpendicular to the direction of the accelerations being measured and to the axis of rotation of the container. For this purpose guide lugs 57 project outwardly from the unbalance mass 15 and cooperate with the inner surface of the case 56 to guide the mass.

The results realized from the Fig. 5 embodiment will be better appreciated from a consideration of the forces acting on the container 10. Let $a_x$ represent the acceleration of the vehicle on which the acceleration responsive device is mounted in the direction which is to be measured by the acceleration responsive device, and let $a_y$ equal the acceleration of the vehicle in a direction perpendicular to $a_x$ and to the axis of the container. Prior to rotation of the container 10, any forces present due to $a_y$ will have no effect on the measuring accuracy of the device and the torque $T_a$, due to linear acceleration, causing rotation of the container 10 will be equal to the product of the unbalance mass times the radius $r$ through which it acts times $a_x$. However, upon rotation of the container 10 through some small angle E it will be seen that the force due to $a_y$ acting on the now displaced unbalance mass 15 will produce a torque $T_y$ acting in the opposite direction from the torque $T_a$ and tending to nullify the torque $T_a$ and thereby introduce an error into the acceleration responsive device. The function of the coil spring 55 will be to compress in response to the force due to acceleration $a_y$ and permit the effective radius $r$ to increase (to $r^1$) allowing the force due to acceleration $a_x$ to have more effect thus substantially compensating for the $a_y$ effect.

In the embodiment shown in Figs. 6 and 7 the unbalance mass 15 is mounted on a resilient support which is flexible both in the direction of the acceleration being measured, and in a direction perpendicular to the direction being measured and to the axis of rotation of the acceleration responsive element. Flexibility of the support in both directions is indicated in Fig. 7 by the dotted line positions of the mass 15. This form of the resilient support includes two leaf springs 60 and 61 connected by a coupler 62, carries the unbalance mass 15 at one end, and is supported at the other end by a bracket 63 carried by the container 10. Damping is accomplished by the provision of an oil-filled case 64 surrounding the spring and mass system. It will be appreciated that the leaf springs 60 and 61 can have the same stiffness or different stiffnesses depending on the particular characteristics of the device they are used with.

While each of the illustrated embodiments discussed shows only one unbalance mass with a damped resilient support means, it is to be understood that a plurality of unbalance masses may be used, each supported as taught by this invention. For example, as shown in Fig. 8, it is within the scope of this invention to mount unbalance masses 15a and 15b on supports in the form of springs 50a and 50b. Similarly, in the other embodiments disclosed a plurality of unbalance masses and supports may be provided.

It will be appreciated that while the present invention has been illustrated in use with an acceleration responsive device having a motor and servo system for providing a counter-torque or restoring torque to the acceleration responsive element, the invention has application in such devices having other means of providing a restoring torque.

Also, each embodiment illustrated shows damping means for the spring and mass system in the form of an oil-filled casing, but it will be readily appreciated by those skilled in the art that many other forms of damping may be used within the scope of this invention. Examples of such other forms are spring, electromagnetic dampers and pneumatic dampers. Furthermore although an effective means for damping is shown, it will be recognized by those skilled in the art that a greater or lesser degree of damping may be required for any particular set of design requirements so that in some cases no damping means as such will be needed.

While there have been shown and described particular embodiments of the invention, it will be obvious to those skilled in the art that various changes and modifications may be made without departing from my invention in its broader aspects and, therefore, it is intended in the appended claims to cover all such changes and modifications as fall within the true spirit and scope of the invention.

What is claimed as new and desired to be secured by Letters Patent of the United States is:

1. In an acceleration responsive device including an acceleration responsive element rotatably mounted for rotation about an axis, at least one unbalance mass eccentrically carried by said element so as to impart a first torque to said element in response to accelerations of the device, and means for imparting a counter-torque to said element in response to movement caused by said first torque, said counter-torque being effective to maintain said element in its original position, the improvement wherein said unbalance mass is mounted on a resilient support carried by said acceleration responsive element.

2. In an acceleration responsive device including an acceleration responsive element rotatably mounted for rotation about an axis, at least one unbalance mass eccentrically carried by said element so as to impart a first torque to said element in response to accelerations of the device, and means for imparting a counter-torque to said element in response to movement caused by said first torque, said counter-torque being effective to maintain said element in its original position, the improvement wherein said unbalance mass is mounted on a resilient support which is flexible in the direction of the accelerations being measured.

3. In an acceleration responsive device including an acceleration responsive element rotatably mounted for rotation about an axis, at least one unbalance mass eccentrically carried by said element so as to impart a first torque to said element in response to accelerations of the device, and means for imparting a counter-torque to said element in response to movement caused by said first torque, said counter-torque being effective to maintain said element in its original position, the improvement wherein said unbalance mass is mounted on a resilient support which is flexible in the direction substantially perpendicular to the direction of the accelerations being measured and perpendicular to said axis.

4. In an acceleration responsive device including an acceleration responsive element rotatably mounted for rotation about an axis, at least one unbalance mass eccentrically carried by said element so as to impart a first torque to said element in response to accelerations of the device, and means for imparting a counter-torque to said element in response to movement caused by said first torque, said counter-torque being effective to maintain said element in its original position, the improvement comprising a resilient support attached to said acceleration responsive element and supporting said unbalance mass, said member being flexible in the direction of the accelerations being measured and also being flexible in the direction perpendicular to the first-mentioned direction and perpendicular to said axis, and means for damping the movement of said unbalance mass in both of said directions.

5. An acceleration responsive device including an acceleration responsive element rotatably mounted for rotation about an axis, a plurality of unbalance masses eccentrically carried by said element so as to impart a first torque to said element in response to accelerations of the device, and means for imparting a counter-torque to said element in response to movement caused by said first torque, said counter-torque being effective to maintain said element in its original position, each of said unbalance masses being mounted on a resilient support secured to said acceleration responsive element.

References Cited in the file of this patent
UNITED STATES PATENTS
2,618,776    Wiancko _____ Nov. 18, 1952